United States Patent [19]
Budd et al.

[11] Patent Number: 5,943,171
[45] Date of Patent: Aug. 24, 1999

[54] HEAD MOUNTED DISPLAYS UTILIZING REFLECTION LIGHT VALVES

[75] Inventors: Russell Alan Budd, North Salem; Derek Brian Dove, Mt. Kisco, both of N.Y.

[73] Assignee: International Business Machines Corporation, Armonk, N.Y.

[21] Appl. No.: 09/089,569

[22] Filed: Jun. 3, 1998

[51] Int. Cl.$^6$ .................................................. G02B 27/14
[52] U.S. Cl. .......................................... 359/631; 359/633
[58] Field of Search ................................... 359/630, 631, 359/633; 345/7, 8

[56] References Cited

U.S. PATENT DOCUMENTS

| | | | |
|---|---|---|---|
| 5,526,184 | 6/1996 | Tokuhashi et al. | 359/630 |
| 5,596,451 | 1/1997 | Handschy et al. | 359/633 |
| 5,831,712 | 11/1998 | Tabata et al. | 351/158 |

OTHER PUBLICATIONS

C. McLaughlin (1997) "Personal Display's Tug of War: ..." *Portable Design*: 54–57.

*Primary Examiner*—Georgia Epps
*Assistant Examiner*—Ricky Mack
*Attorney, Agent, or Firm*—Scully, Scott, Murphy & Presser; Daniel P. Morris

[57] ABSTRACT

A head mounted display for entering an image into the eye of a viewer along a viewing axis. The head mounted display has a light source for supplying unpolarized light to an optical path. Also provided is a first polarizer disposed in the optical path for rotating the unpolarized light to that of a first polarization. A second polarizer is also disposed in the optical path for blocking light of the first polarization from reaching the eye. A reflective light valve is disposed in the optical path for rotating the light of the first polarization to an image of a second polarization. Also provided is a concave mirror disposed in the optical path for focusing and reflecting the image of the second polarization. Lastly, a directing means is provided for directing the light of the first polarization to the reflective light valve, for directing the image of the second polarization to the concave mirror, and for directing the focused and reflected image from the concave mirror towards the second polarizer. The second polarizer then transmits the focused and reflected image towards the eye of the viewer along the viewing axis.

26 Claims, 9 Drawing Sheets

HEAD MOUNTED DISPLAYS UTILIZING REFLECTION LIGHT VALVES

BACKGROUND OF THE INVENTION

1. Field of the Invention

The field of art to which this invention relates is personal or head mounted displays. It is more particularly directed to head mounted displays which utilize reflection type light valves. Such head mounted displays are of interest in a wide range of applications, including games, engineering, medicine, science, entertainment, and computers.

2. Description of the Related Art

Present head mounted displays employ light valves (spatial light modulators or SLM's) consisting of transparent liquid crystal display (LCD) panels. Head mounted displays of this type are characterized by their high weight, low resolution, and high cost.

A new type of reflective LCD panel is being developed having potential for much higher resolution. However, these new LCD panels are constructed on a silicon substrate in order to take advantage of known silicon technology in which the liquid crystal material sits on an array of mirrors, one mirror to each pixel in the LCD. These new reflective LCD panels are characterized by their low weight, high resolution and low cost. Accordingly, it is desirable to employ these new reflective light valves in a head mounted display.

SUMMARY OF THE INVENTION

It is an object of the present invention to provide a head mounted display which utilizes reflection type light valves making it cheaper to fabricate than prior art head mounted displays utilizing transmissive light valves.

It is another object of the present invention to provide a head mounted display which utilizes reflection type light valves making it of lower weight than prior art head mounted displays utilizing transmissive light valves.

It is yet still another object of the present invention to provide a head mounted display which utilizes reflection type light valves making it of higher resolution than prior art head mounted displays utilizing transmissive light valves.

Accordingly, a first embodiment of a head mounted display for entering an image into the eye of a viewer along a viewing axis is provided. The head mounted display comprises a light source for supplying unpolarized light to an optical path. Also provided is a first polarizer disposed in the optical path for rotating the unpolarized light to that of a first polarization. A second polarizer is also disposed in the optical path for blocking light of the first polarization from reaching the eye. A reflective light valve is disposed in the optical path for rotating the light of the first polarization to an image of a second polarization. Also provided is a concave mirror disposed in the optical path for focusing and reflecting the image of the second polarization. Lastly, a directing means is provided for directing the light of the first polarization to the reflective light valve, for directing the image of the second polarization to the concave mirror, and for directing the focused and reflected image from the concave mirror towards the second polarizer. The second polarizer then transmits the focused and reflected image towards the eye of the viewer along the viewing axis.

A second variation of the first embodiment is provided wherein the directing means comprises a polarization beam splitter for passing light of the first polarization and reflecting light of the second polarization, and a quarter wave plate disposed in the optical path between the polarization beam splitter and the concave mirror. Whereby the light of the first polarization passes through the polarization beam splitter and is directed towards the reflective light valve. The image of the second polarization is then reflected by the polarization beam splitter and directed to the quarter wave plate which rotates the polarization of the image 90 degrees. The focused and reflected image from the concave mirror passes through the quarter wave plate which rotates the focused and reflected image another 90 degrees such that it passes through the polarization beam splitter and is directed towards the second polarizer and the eye along the viewing axis.

A third variation of the first embodiment is provided wherein the concave mirror has a semi-transparent coating having a degree of transparency for viewing external objects concurrently with the image.

Also provided is a second embodiment of the head mounted display for entering an image into the eye of a viewer while allowing external objects to be viewed concurrently with the image about a viewing axis. The head mounted display comprises a light source for supplying light of first and second polarizations to an optical path. Also provided is a reflective light valve disposed in the optical path for reflecting an image of a second polarization. A concave mirror is disposed in the optical path. A directing means for directing light of the first polarization to the reflective light valve, and for directing the image of the second polarization from the reflective light valve to the concave mirror is also provided. Lastly, a semi-transparent mirror having a degree of transparency is disposed between the directing means and the concave mirror at an intersection of the optical path and the viewing axis such that the image of the second polarization passes though the semi-transparent mirror, is focused and reflected by the concave mirror and directed back towards the semi-transparent mirror. The focused and reflected image is then reflected by the semi-transparent mirror towards the eye of the viewer along the viewing axis thereby allowing the viewing of the external objects concurrently with the image through the semi-transparent mirror.

A first variation of the second embodiment is provided wherein the directing means comprises a polarization beam splitter for reflecting light of the first polarization towards the reflective light valve and for passing the image of the second polarization towards the curved mirror.

A second variation of the second embodiment is provided which further comprises a first polarizer disposed in the optical path between the light source and the directing means for rotating the light of the light source to that of a first polarization, and a second polarizer disposed in the optical path between the directing means and the concave mirror for blocking light of the first polarization from reaching the eye.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE INVENTION

Figure 1:
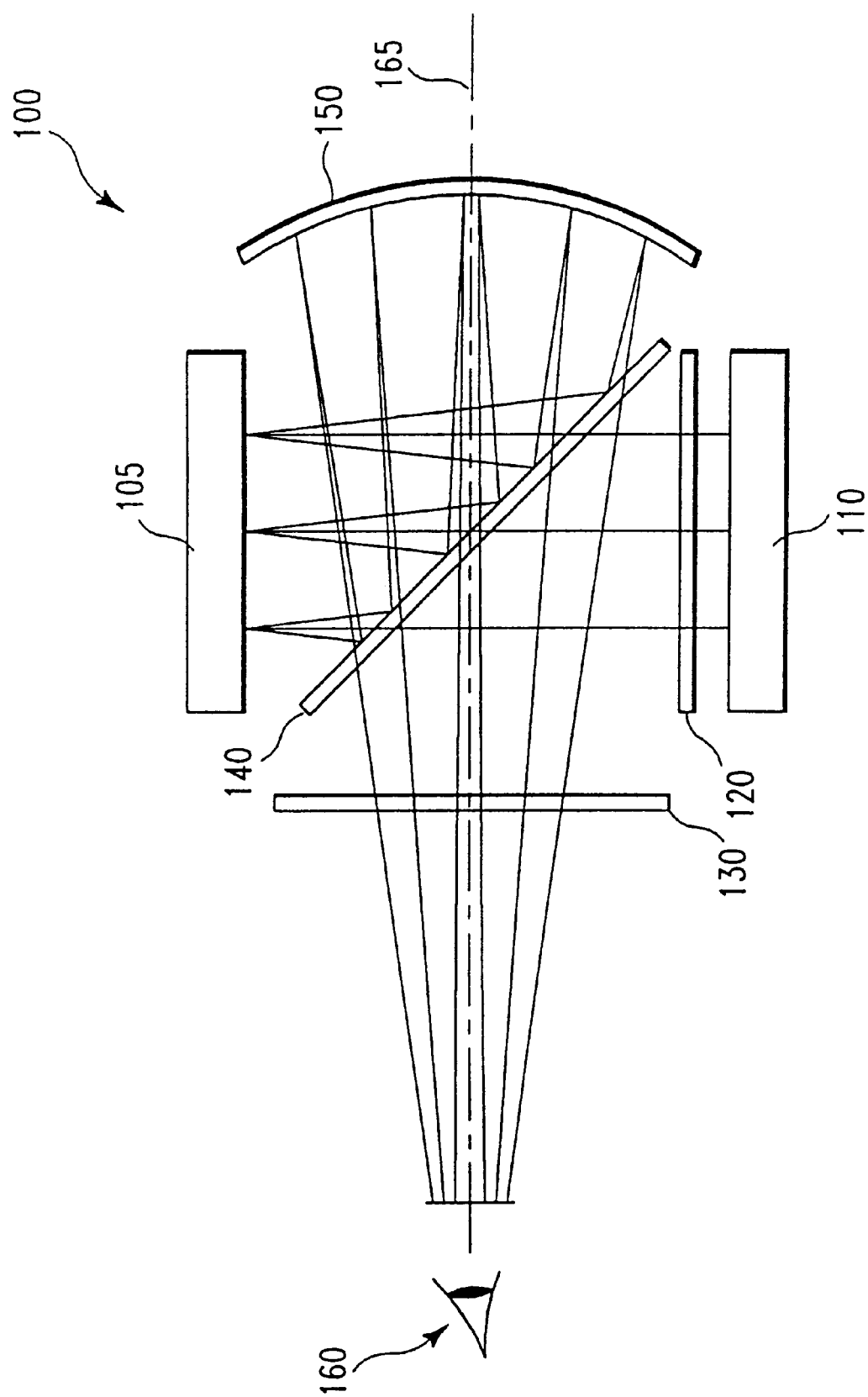
FIG. 1 illustrates an optical schematic of a first variation of a first embodiment of the head mounted display of the present invention.

Referring now to FIG. 1, there is illustrated a first variation of a head mounted display of a first embodiment of the present invention, generally referred to by reference numeral 100 wherein a reflective type spatial light modulator 105, otherwise referred to as an SLM, or a light valve, is illuminated by a light source 110. Light from the light source 110 passes through a polarizer 120 and a directing means, such as a semitransparent mirror 140 before reaching the SLM 105. Light that is partially reflected by the semitransparent mirror 140 is blocked from entering the eye 160 of the viewer by polarizer 130 which is set to block all rays of unrotated polarization. Light reflected from the SLM 105 who's polarization is unrotated is reflected by the semitransparent mirror 140 and reaches the concave mirror 150 and is directed through the semitransparent mirror 140 and toward the eye 160 along a viewing axis 165, but is blocked by the polarizer 130. The action of polarizers 120 and 130 can be understood in that they are placed in opposition so that light from the light source 110 that is unrotated in polarization after leaving polarizer 120 is blocked from reaching the eye 160.

It is understood by someone skilled in the art, that the SLM 105 is composed of an array of microscopic mirrors or pixels covered by an electro-optic material such as a liquid crystal material that produces the effect of rotation of incident light when a voltage is applied. This light of rotated polarization is allowed by design of the optical system as described to enter the eye 160 of the viewer along the viewing axis 165. By controlling the pattern of voltages applied to the array of pixels, the stream of light entering the eye 160 may be controlled to produce a desired image, of for example, text or other information.

In operation, it is apparent to someone skilled in the art that the rays of rotated polarization from the SLM 105 are reflected by the semitransparent mirror 140 to the concave mirror 150, are reflected by the concave mirror 150 back towards the eye 160. On the way back towards the eye 160, the reflected rays from the concave mirror 150 pass through the semitransparent mirror 140 and are transmitted by the polarizer 130 and enter the eye 160 of the viewer along the viewing axis 165. The curved mirror 150 thus provides an enlarged image of the SLM 105 as revealed by, and controlled by, the action of the electric fields applied to the array of pixels therein.

Figure 2:
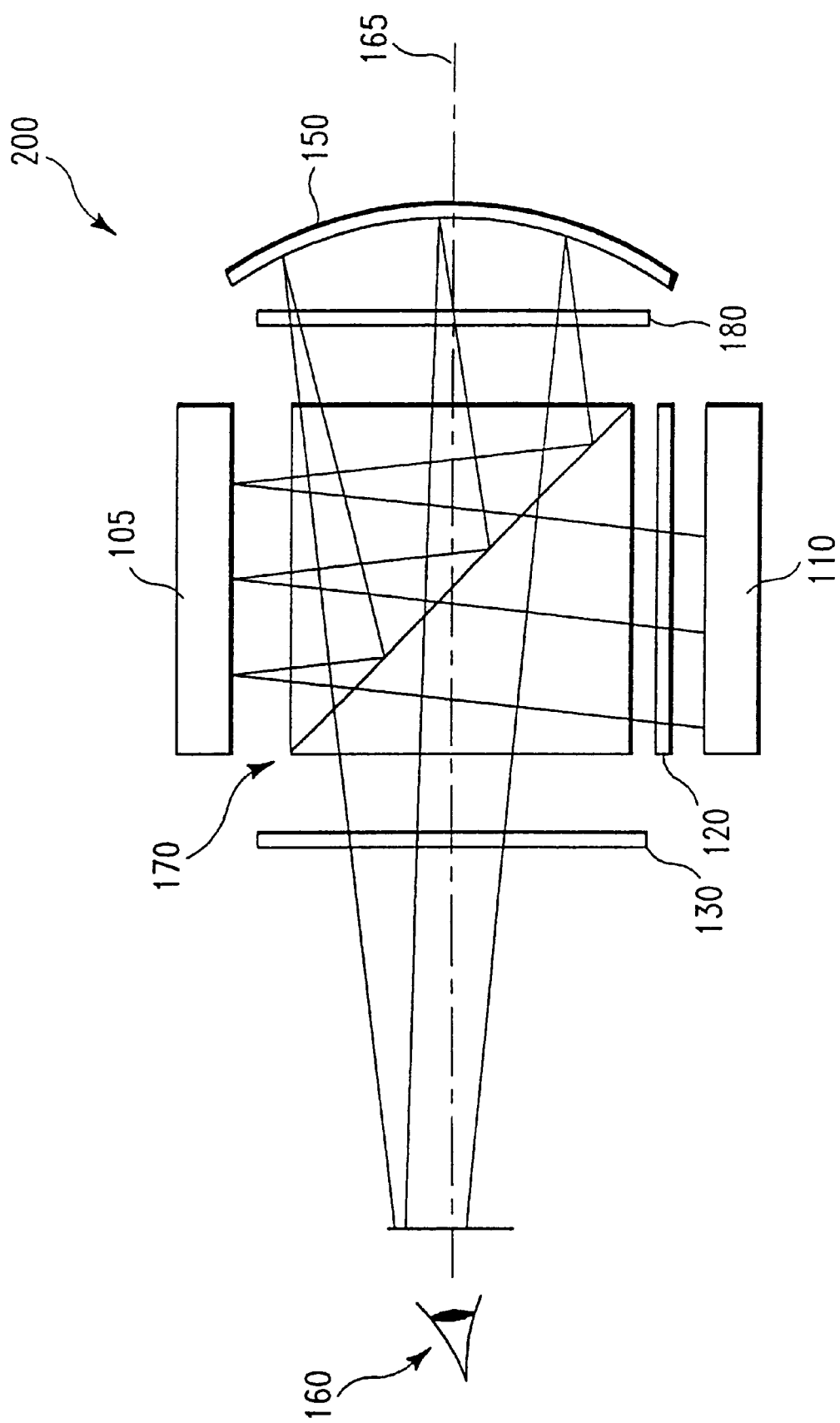
FIG. 2 illustrates an optical schematic of a second variation of the head mounted display of the first embodiment of the present invention.

Referring now to FIG. 2, therein is illustrated a second variation of the first embodiment of the present invention in which all components similar to or identical with those in FIG. 1 are designated with the same reference numerals, is merely modified with regard to the previous variation, in that the directing means is a polarizing beam splitter (PBS) 170 and a one-quarter wave retardation plate 180.

The solid cube PBS 170, replaces the semitransparent mirror 140 of FIG. 1. In addition a one-quarter wave retardation plate 180 is introduced between the PBS 170 and the concave mirror 150. Light from the source 110 passes through the polarizer 120 and through the PBS 170 before reaching the SLM 105. Light reflected from the SLM 105 who's polarization is unrotated is transmitted by the PBS 170 towards the light source 110. Rays of rotated polarization from the SLM 105 are reflected by the PBS 170 towards the one-quarter wave retardation plate 180. The one-quarter wave retardation plate 180 acts to convert the linearly polarized light into circularly polarized light. The light rays are reflected by the concave mirror 150 back towards the eye 160, passing once again through the one-quarter wave retardation plate 180 which converts the rays to linearly polarized light who's orientation is rotated 90 degrees from that of the rays which first approached the one-quarter wave retardation plate 180. The rays next continue through the PBS 170 and into the eye 160 of the viewer along the viewing axis 165. The one-quarter wave retardation plate 180 in combination with the concave mirror 150 serve as a polarization rotation mechanism, therefore nearly 100% of the useful image forming rays from the SLM 105 are first reflected by the PBS 170 on the first pass and are also transmitted by the PBS 170 on the second pass after reflection by the concave mirror 150.

It is understood that the optical system 200 of FIG. 2 provides improved efficiency as compared with the optical system 100 described in FIG. 1. However, a heavier PBS is required in FIG. 2. Once again, the curved mirror 150 provides an enlarged image of the SLM 105 as revealed by and controlled by the action of the electric fields applied to the array of pixels therein.

Figure 3:
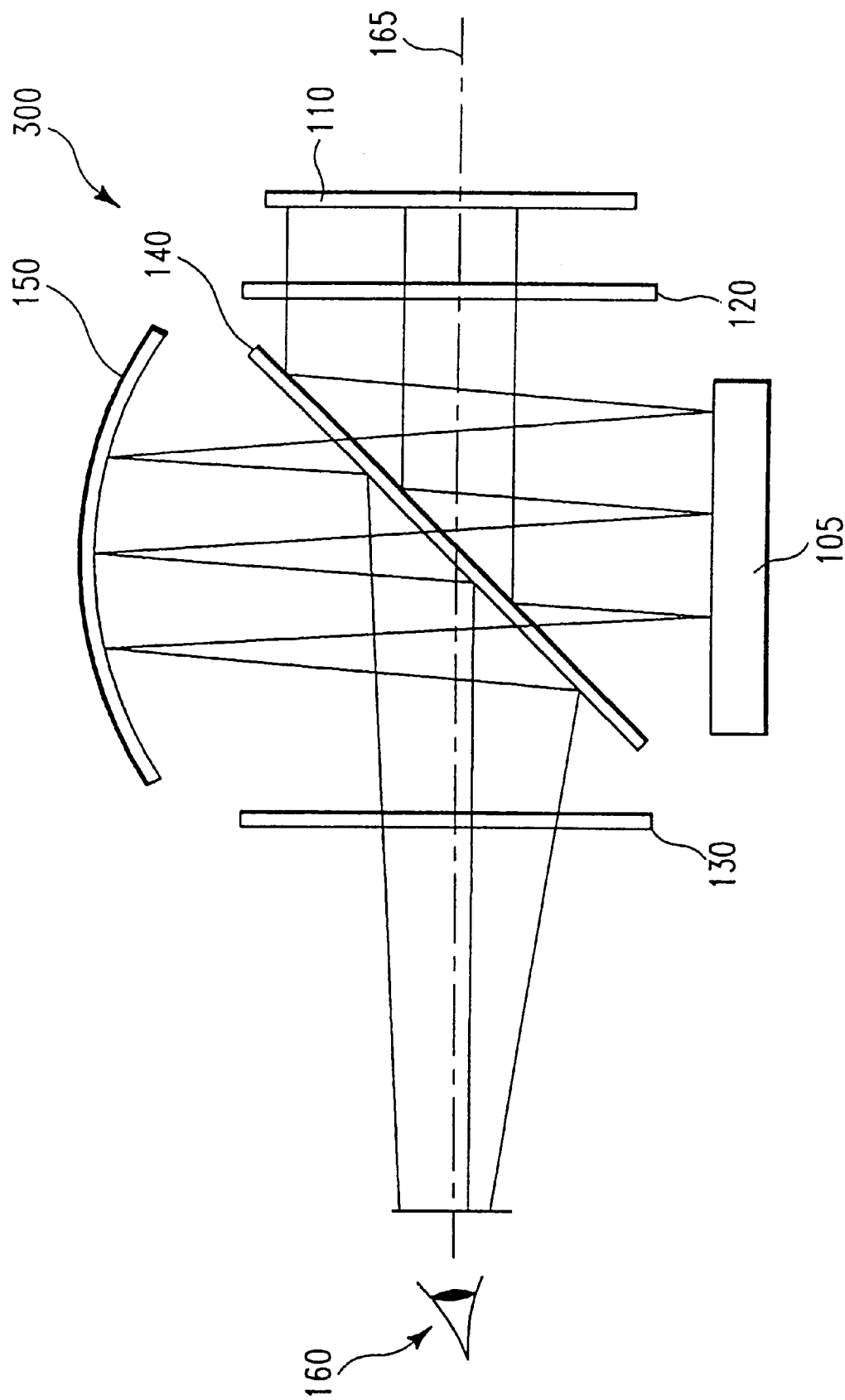
FIG. 3 illustrates an optical schematic of a third variation of the head mounted display of the first embodiment of the present invention.

Referring now to FIG. 3, there is illustrated a variation of the embodiment of FIG. 1, showing an alternative arrangement of the elements therein, referred to generally by reference numeral 300. The curved mirror 150 has been moved to the top of the system 300 and the light source 110 moved to the front of the system 300. The optical system 300 of FIG. 3 functions as described with regard to FIG. 1. Additionally, the system 300 can be rotated to any angle around the viewing axis, for example to where the SLM 105 is on top and the curved mirror 150 on the bottom. The particular arrangement preferred would be a function of the particular product requirements. In addition, the semitransparent mirror 140 may be replaced with a PBS 170 as described with regard to FIG. 2 in order to improve the optical efficiency of the system.

Figure 4:
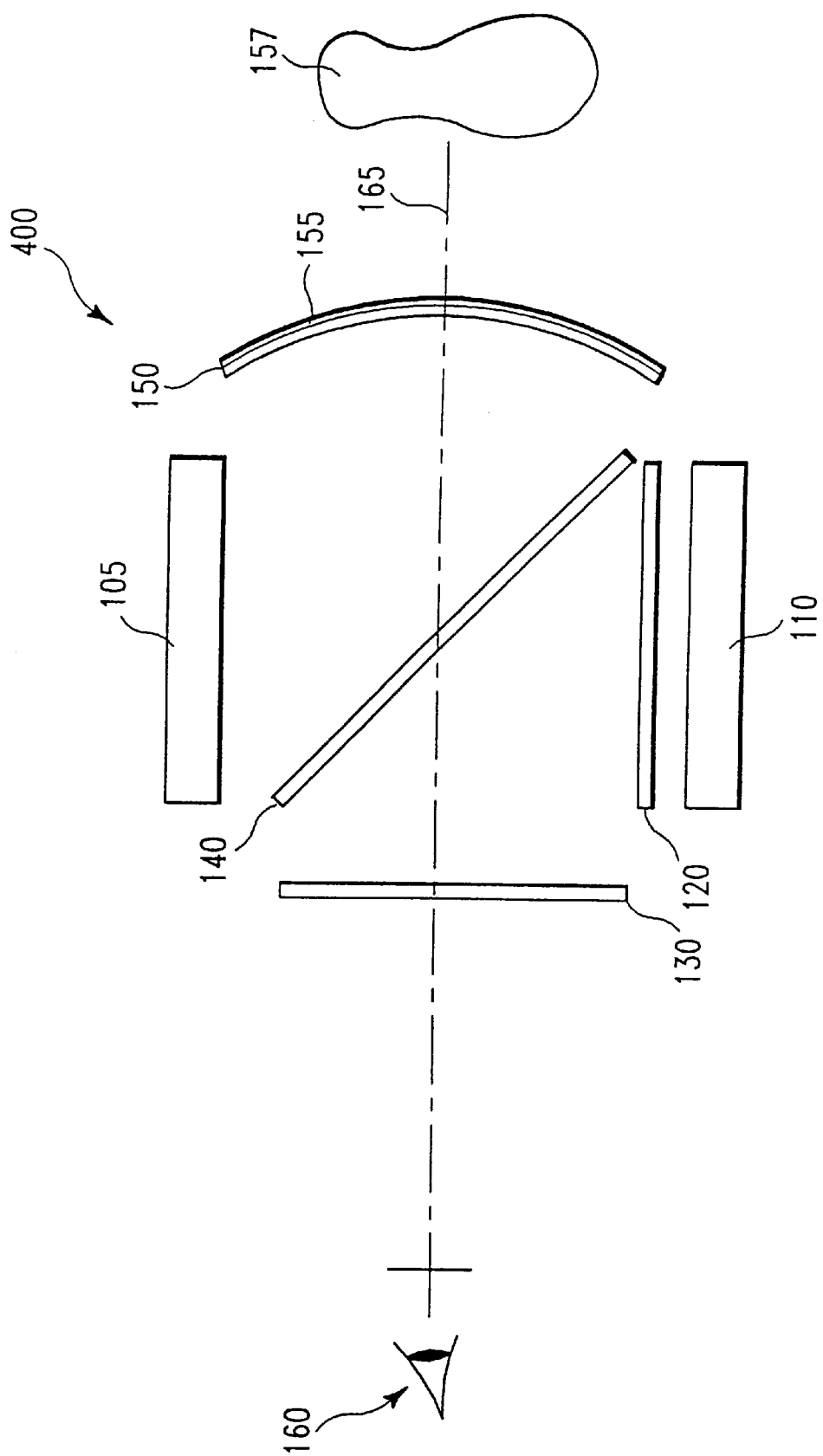
FIG. 4 illustrates an optical schematic of a fourth variation of the head mounted display of the first embodiment of the present invention.

Referring now to FIG. 4, there is illustrated another variation of the first embodiment of the head mounted display of the present invention, referred to generally by reference numeral 400. Head mounted display 400 is similar to that described in FIG. 1 except that the concave mirror 150 contains a semi-transparent coating 155 so that external objects 157 may be viewed concurrently while viewing the magnified image of the SLM 100. The degree of transparency of the semi-transparent coating 155 may be set anywhere between 0% and 100% in order to vary the brightness of the external objects 157. Preferably the degree of transparency is in the range of between 40% to 50%. In addition, the semitransparent mirror 140 may be replaced with a PBS 170 as described with regard to FIG. 2 in order to improve the optical efficiency of the system.

Figure 5:
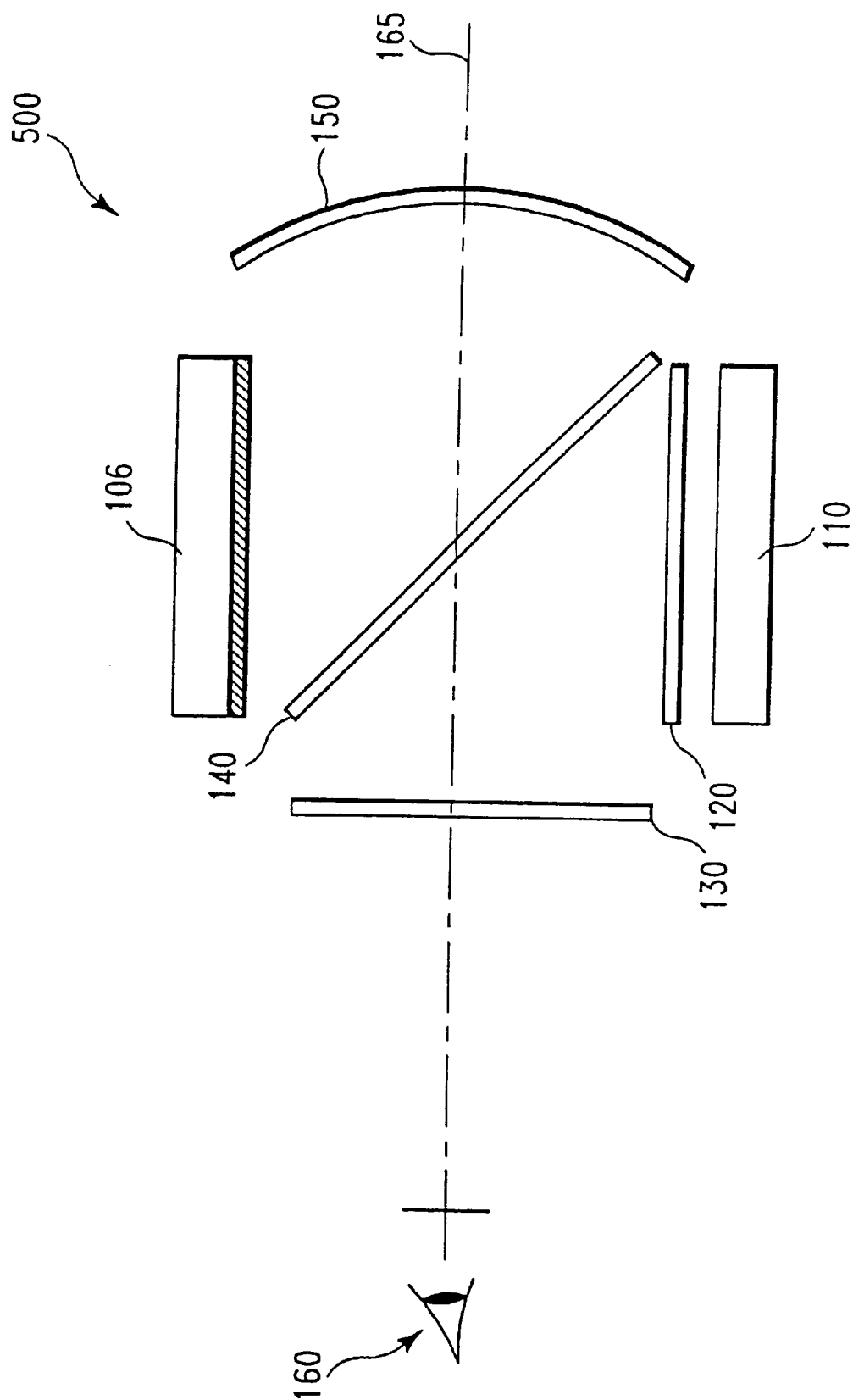
FIG. 5 illustrates an optical schematic of a fifth variation of the head mounted display of the first embodiment of the present invention.

Referring now to FIG. 5, there is illustrated yet another variation of the first embodiment of the present invention, referred to generally by reference numeral 500. In this variation the SLM 105 of FIG. 1 is replaced by SLM 106 containing an array of pixels in which color filters are disposed to produce a color image. The structure and operation of such an SLM 106 is well known in the art. In addition, the semitransparent mirror 140 may be replaced with a PBS 170 as described with regard to FIG. 2 in order to improve the optical efficiency of the system.

Figure 6:
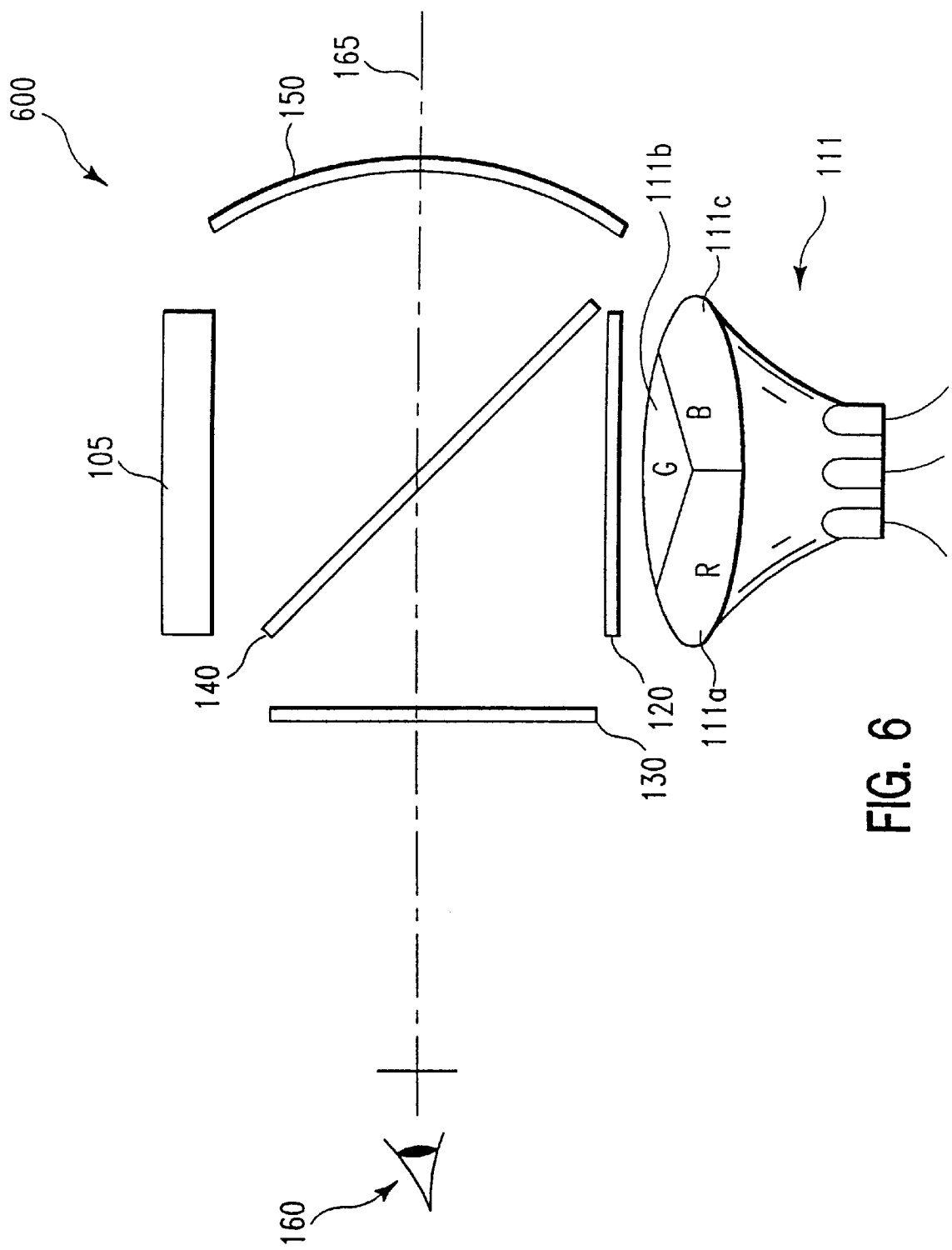
FIG. 6 illustrates an optical schematic of a sixth variation of the head mounted display of the first embodiment of the present invention.

Referring now to FIG. 6, there is illustrated yet another variation of the first embodiment of the present invention, referred to generally by reference numeral 600. In this variation, the light source 110 of FIG. 1 is replaced by a source 111 capable of sequentially illuminating the SLM 105 in red, green, or blue, such as a field sequential light source to produce a color image. The field sequential light source 111 has segments 111a, 111b, 111c, of different color filters, for sequentially providing light of different colors to the reflective SLM 105. The reflective SLM 105 rotates component images of each different color, the combination of which produces the color image.

Preferably, the different color segments 111a, 111b, 111c are red, green, and blue color filters, respectively. The field sequential light source 111 is preferably a flat fluorescent sequential light source or a flat LED sequential light source. However, it is understood that the field sequential light source can be of any type, now known or later developed, that sequentially supplies light of different colors capable of being optically combined into a color image. In addition, the semitransparent mirror 140 may be replaced with a PBS 170 as described with regard to FIG. 2 in order to improve the optical efficiency of the system.

Figure 7:
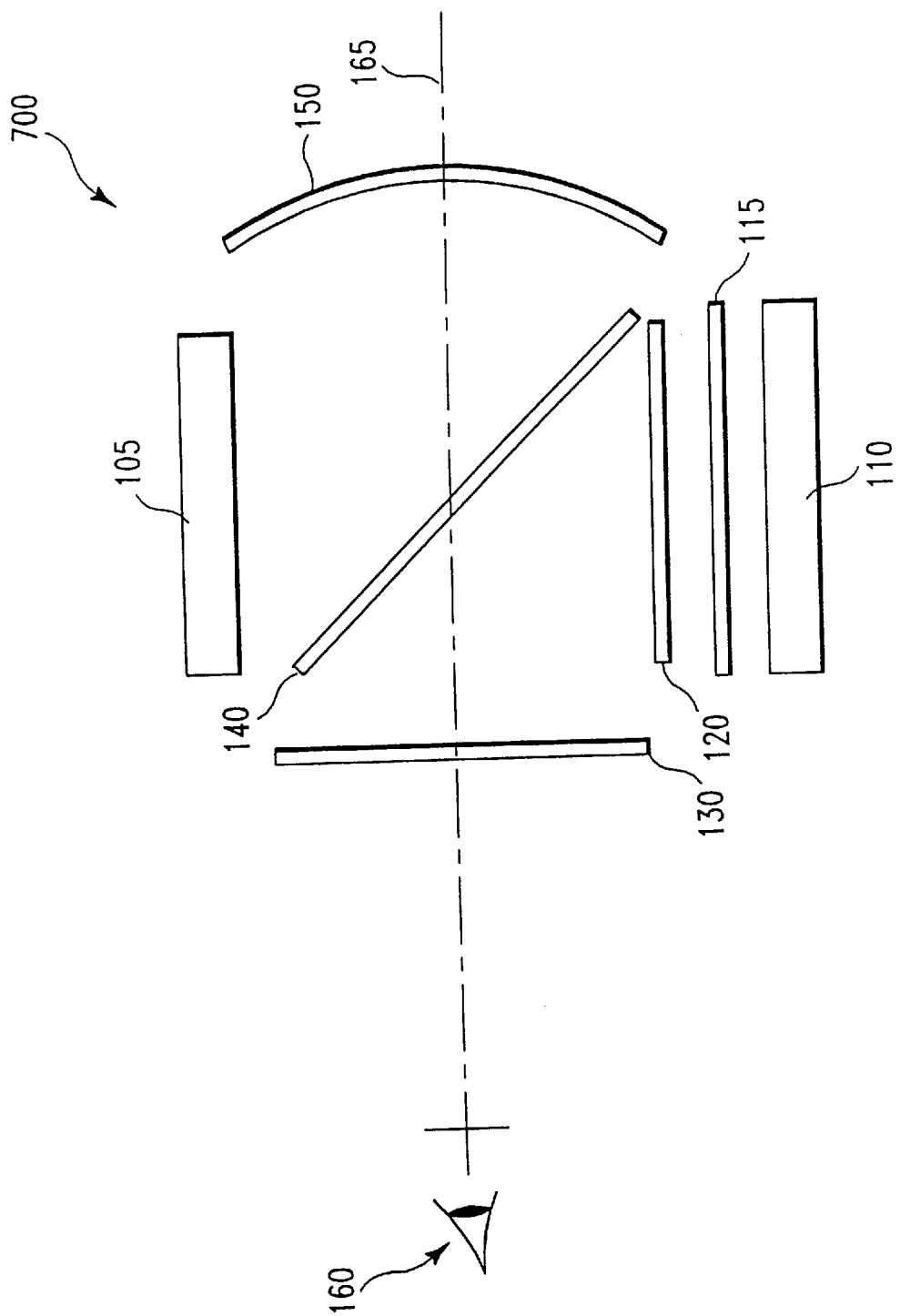
FIG. 7 illustrates an optical schematic of a seventh variation of the head mounted display of the first embodiment of the present invention.

Referring now to FIG. 7, there is illustrated yet another variation of the first embodiment of the present invention, referred to generally by reference numeral 700. In this variation, the light source 110 of FIG. 1 is replaced by a adjustable color light source, or shutter 115 disposed between the light source 110 and the first polarizer 120 so as to allow images to be viewed in one of a predetermined color, such as red, green, or blue. Preferably, the adjustable color shutter 115 is a ferro-electric color filter. In addition, the semitransparent mirror 140 may be replaced with a PBS 170 as described with regard to FIG. 2 in order to improve the optical efficiency of the system.

Figure 8:
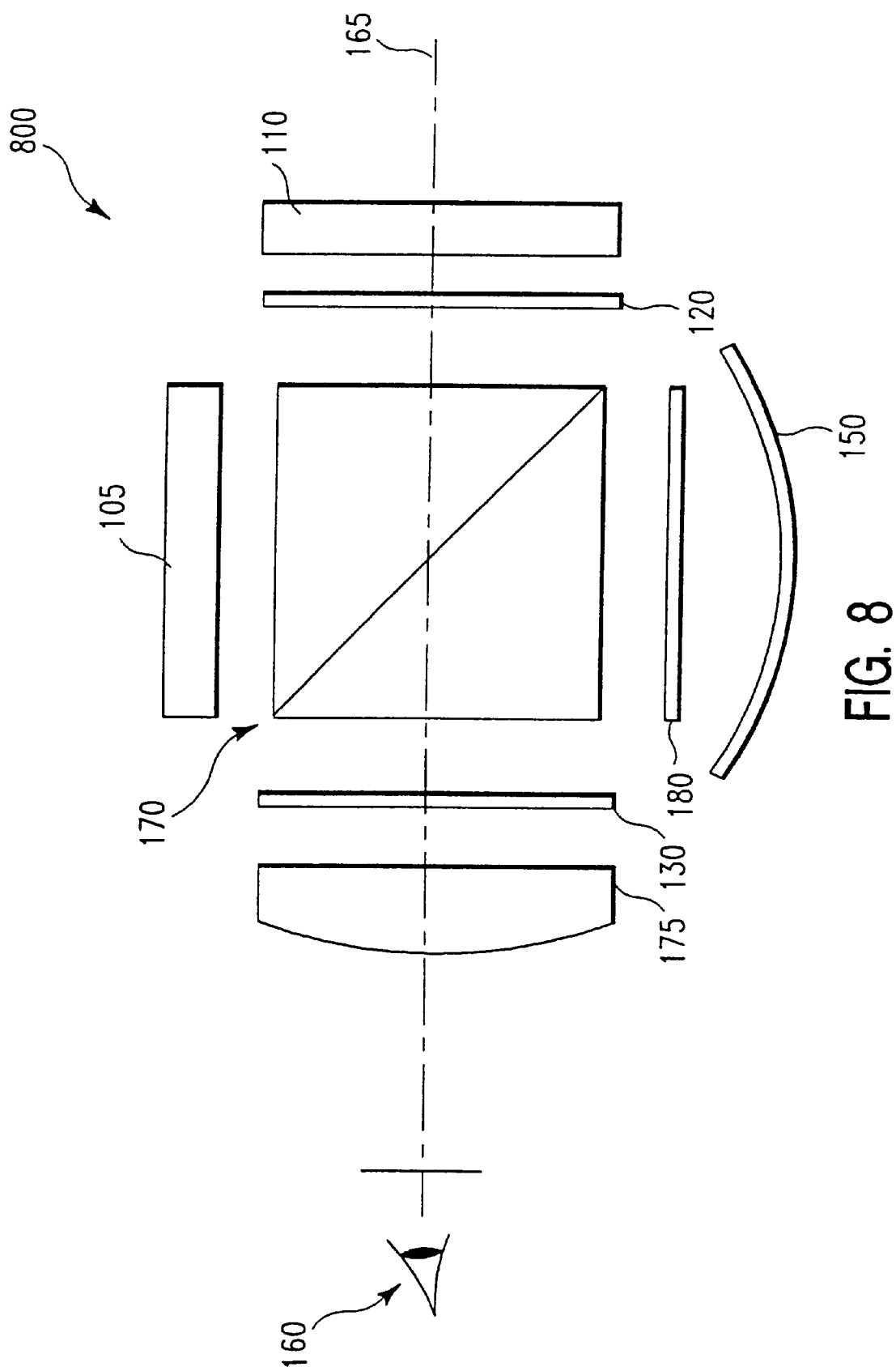
FIG. 8 illustrates an optical schematic of a eighth variation of the head mounted display of the first embodiment of the present invention.

Referring now to FIG. 8, there is illustrated still yet another variation of the first embodiment of the present invention, referred to generally by reference numeral 800. In this variation, an additional lens 175 is added between the PBS 175 and the viewer's eye 160 for additional focusing of the image on the eye 160 of the viewer. The focusing power is thus split between the concave mirror 150 and the lens 175. It can be seen that this arrangement provides a compact package and minimizes the required size of the PBS 170, at the expense of the additional lens 175. The system 800 of FIG. 8 may be favored over that of FIG. 1 if compactness is the primary requirement. However, the system 100 of FIG. 1 may be selected if simplicity, and its inherent lower cost, is favored.

Figure 9:
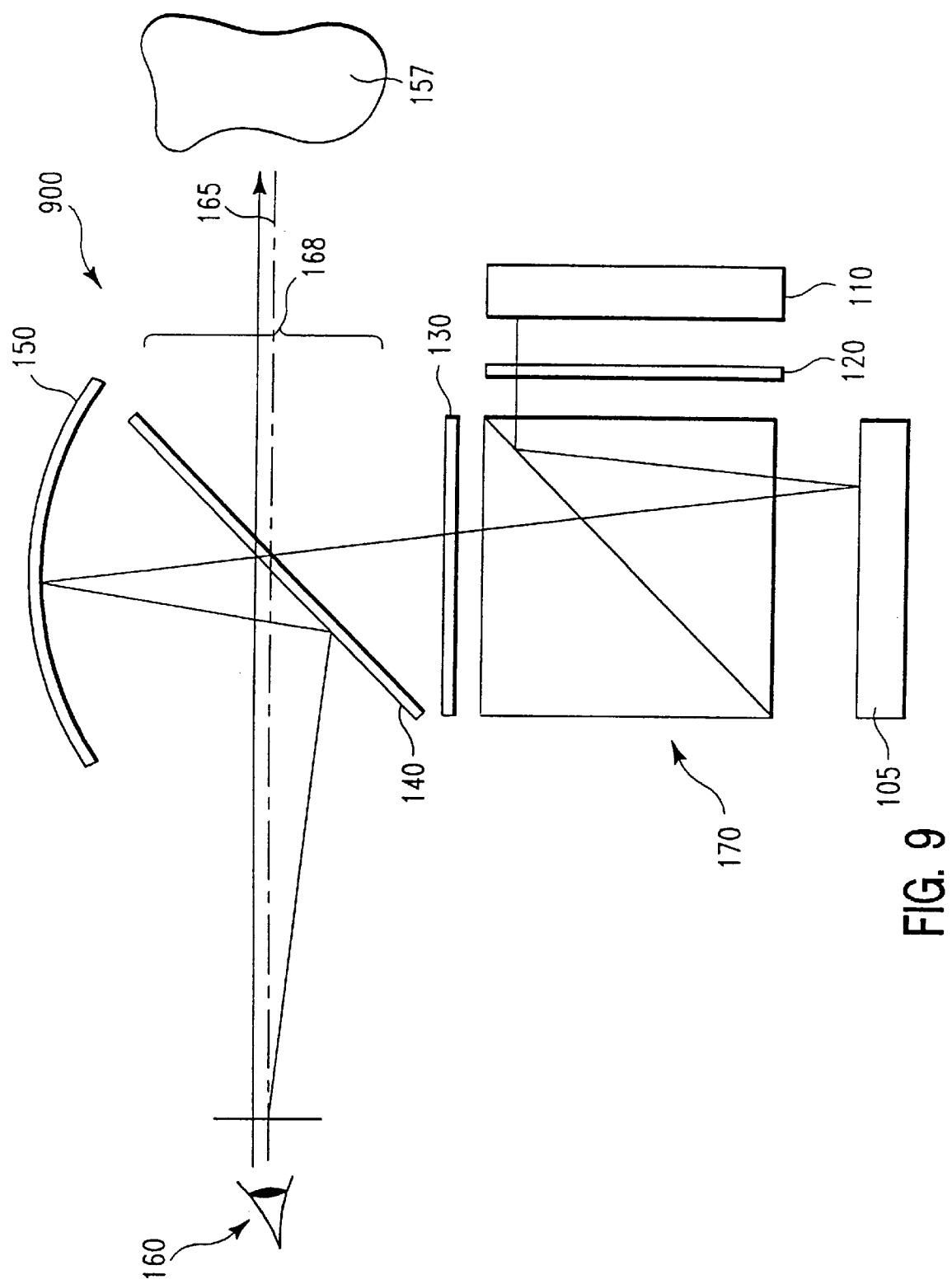
FIG. 9 illustrates an optical schematic of a second embodiment of the head mounted display of the present invention.

Referring now to FIG. 9, there is illustrated a second embodiment of the present invention, referred to generally by reference numeral 900 in which a PBS 170 is combined with a semi-transparent mirror 140. This arrangement provides a separation between the light source 110/SLM 105 and the imaging optics consisting of the semi-transparent mirror 140 and the concave mirror 150. By separating these elements, a see-through function is now available. The user can see a magnified image of the SLM 100 image as well as a view of the surrounding environment 157 about the viewing axis 165.

The head mounted display 900 of FIG. 9 has a light source 110 for supplying light of first and second polarizations to an optical path. A reflective light valve 105 is disposed in the optical path for reflecting an image of a second polarization. A concave mirror 150 is disposed in the optical path, as is a directing means, such as a PBS 170 for directing light of the first polarization to the reflective light valve 105, and for directing the image of the second polarization to the concave mirror 150. In addition, a semi-transparent mirror 140 having a degree of transparency, preferably within a range of 40% to 50%, is disposed between the PBS 170 and the concave mirror 150 at an intersection 168 of the optical path and the viewing axis 165.

In operation, the image of the second polarization passes though the semi-transparent mirror 140, is focused and reflected by the concave mirror 150 and directed back towards the semi-transparent mirror 140. The focused and reflected image is then reflected by the semi-transparent mirror 140 towards the eye 160 of the viewer along the viewing axis 165 thereby allowing the viewing of the external objects 157 concurrently with the image through the semi-transparent mirror 140.

Preferably, the head mounted display 900 of FIG. 9 includes a first polarizer 120 disposed in the optical path between the light source 110 and the PBS 170 for rotating the light of the light source 110 to that of a first polarization, and a second polarizer 130 disposed in the optical path between the PBS 170 and the concave mirror 150 for blocking light of the first polarization from reaching the eye 165. The first and second polarizers 120, 130 provide the same function as previously described with regard to the embodiment of FIG. 1. Additionally, it is apparent to someone skilled in the art that the head mounted display 900 of FIG. 9 can take on any of the variations previously described, particularly those associated with FIGS. 5–7.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by letters patent is:

1. A head mounted display for entering an image into the eye of a viewer along a viewing axis, the head mounted display comprising:

a light source for supplying unpolarized light to an optical path, a first polarizer disposed in the optical path for rotating the unpolarized light to that of a first polarization, a second polarizer disposed in the optical path for blocking light of the first polarization from reaching the eye, a reflective light valve disposed in the optical path for rotating the light of the first polarization to an image of a second polarization, a concave mirror disposed in the optical path for focusing and reflecting the image of the second polarization, and a directing means for directing the light of the first polarization to the reflective light valve, for directing the image of the second polarization to the concave mirror, and for directing the focused and reflected image from the concave mirror towards the second polarizer, which transmits the focused and reflected image towards the eye of the viewer along the viewing axis.

2. The head mounted display of claim 1, wherein the directing means is a semi-transparent mirror oriented with respect to the light source, reflective light valve, concave mirror, and first and second polarizers such that the light of the first polarization passes through the semi-transparent mirror and is directed towards the reflective light valve, the image of the second polarization is reflected by the semi-transparent mirror and directed to the concave mirror, and the focused and reflected image from the concave mirror passes through the semi-transparent mirror and is directed towards the second polarizer and the eye along the viewing axis.

3. The head mounted display of claim 1, wherein the directing means comprises:

a polarization beam splitter for passing light of the first polarization and reflecting light of the second polarization, and a quarter wave plate disposed in the optical path between the polarization beam splitter and the concave mirror, whereby the light of the first polarization passes through the polarization beam splitter and is directed towards the reflective light valve, the image of the second polarization is reflected by the polarization beam splitter and directed to the quarter wave plate which rotates the polarization of the image 90 degrees, and the focused and reflected image from the concave mirror passes through the quarter wave plate which rotates the focused and reflected image another 90 degrees such that it passes through the polarization beam splitter and is directed towards the second polarizer and the eye along the viewing axis.

4. The head mounted display of claim 1, wherein the concave mirror has a semi-transparent coating having a degree of transparency for viewing external objects concurrently with the image.

5. The head mounted display of claim 4, wherein the degree of transparency is within a range of 40% to 50%.

6. The head mounted display of claim 1, wherein the reflective light valve comprises an array of color filters such that the image is a color image.

7. The head mounted display of claim 1, wherein the light source is a field sequential light source having segments of different color filters, for sequentially providing light of different colors to the reflective light valve, such that the reflective light valve rotates component images of each different color, the combination of which produces a color image.

8. The head mounted display of claim 7, wherein the segments of different color filters comprise red, blue, and green filter segments.

9. The head mounted display of claim 7, wherein the field sequential light source is a flat fluorescent sequential light source.

10. The head mounted display of claim 7, wherein the field sequential light source is a flat LED sequential light source.

11. The head mounted display of claim 1, further comprising an adjustable color shutter disposed in the optical path between the light source and the first polarizer for allowing the image to be viewed in one of a predetermined number of colors.

12. The head mounted display of claim 11, wherein the predetermined number of colors include red, green, and blue.

13. The head mounted display of claim 11, wherein the adjustable color shutter is a ferro-electric color filter.

14. The head mounted display of claim 1, further comprising a focusing lens disposed in the optical path between the directing means and the eye for additional focusing of the image on the eye of the viewer.

15. A head mounted display for entering an image into the eye of a viewer while allowing external objects to be viewed concurrently with the image about a viewing axis, the head mounted display comprising:

a light source for supplying light of first and second polarizations to an optical path, a reflective light valve disposed in the optical path for reflecting an image of a second polarization, a concave mirror disposed in the optical path, a directing means for directing light of the first polarization to the reflective light valve, and for directing the image of the second polarization to the concave mirror, and a semi-transparent mirror having a degree of transparency and disposed between the directing means and the concave mirror at an intersection of the optical path and the viewing axis such that the image of the second polarization passes though the semi-transparent mirror, is focused and reflected by the concave mirror and directed back towards the semi-transparent mirror, the focused and reflected image then being reflected by the semi-transparent mirror towards the eye of the viewer along the viewing axis thereby allowing the viewing of the external objects concurrently with the image through the semi-transparent mirror.

16. The head mounted display of claim 15, wherein the directing means comprises a polarization beam splitter for reflecting light of the first polarization towards the reflective light valve and passing the image of the second polarization towards the curved mirror.

17. The head mounted display of claim 15, further comprising:

a first polarizer disposed in the optical path between the light source and the directing means for rotating the light of the light source to that of a first polarization, and a second polarizer disposed in the optical path between the directing means and the concave mirror for blocking light of the first polarization from reaching the eye.

18. The head mounted display of claim 15, wherein the degree of transparency is within a range of 40% to 50%.

19. The head mounted display of claim 15, wherein the reflective light valve comprises an array of color filters such that the image is a color image.

20. The head mounted display of claim 15, wherein the light source is a field sequential light source having segments of different color filters, for sequentially providing light of different colors to the reflective light valve, such that the reflective light valve rotates component images of each different color, the combination of which produces a color image.

21. The head mounted display of claim 20, wherein the segments of different color filters comprise red, blue, and green filter segments.

22. The head mounted display of claim 20, wherein the field sequential light source is a flat fluorescent sequential light source.

23. The head mounted display of claim 20, wherein the field sequential light source is a flat LED sequential light source.

24. The head mounted display of claim 15, further comprising an adjustable color shutter disposed in the optical path between the light source and the directing means for allowing the image to be viewed in one of a predetermined number of colors.

25. The head mounted display of claim 24, wherein the predetermined number of colors include red, green, and blue.

26. The head mounted display of claim 24, wherein the adjustable color shutter is a ferro-electric color filter.

* * * * *